United States Patent
Davies et al.

[11] Patent Number: 6,097,541
[45] Date of Patent: Aug. 1, 2000

[54] LENS ARRANGEMENTS

[75] Inventors: Neil Davies, Goole; Malcolm McCormick, Sheffield, both of United Kingdom

[73] Assignee: De Montfort University, Leicester, United Kingdom

[21] Appl. No.: 09/355,148
[22] PCT Filed: Jan. 26, 1998
[86] PCT No.: PCT/GB98/00223
   § 371 Date: Jul. 22, 1999
   § 102(e) Date: Jul. 22, 1999
[87] PCT Pub. No.: WO98/34133
   PCT Pub. Date: Aug. 6, 1998

[30] Foreign Application Priority Data

Jan. 31, 1997 [GB] United Kingdom ............ 9702006

[51] Int. Cl.⁷ ............................................. G02B 27/10
[52] U.S. Cl. ..................... 359/619; 359/620; 359/621; 359/622
[58] Field of Search ........................ 359/619, 620, 359/621, 622, 623

[56] References Cited

U.S. PATENT DOCUMENTS 5,850,310  12/1998  Schweizer ........................ 359/622

*Primary Examiner*—Georgia Epps
*Assistant Examiner*—Michael A Lucas
*Attorney, Agent, or Firm*—Charles D. Gunter, Jr.

[57] ABSTRACT

There is disclosed a lens arrangement comprising: an input negative macro-lens array negative macro-lens aray; an output negative macro-lens aray disposed with its lenses arranged correspondingly to those of the input array, and between said input and output arrays a double convex microlens array.

12 Claims, 4 Drawing Sheets

LENS ARRANGEMENTS

FIELD OF THE INVENTION

This invention relates to lens arrangements, more particularly for forming three-dimensional images.

BACKGROUND OF THE INVENTION

Lens arrangements are known comprising input and output macrolenses or macrolens arrays with intermediate so-called double-integral transmission microlens screens. In all of these arrangements, the input macrolenses cast an image on to the microlens screen arrangement which transmits rays to the output lenses for reconstitution as a pseudoscopic image that can be captured via a decoding screen on to a sensitised screen such as a photographic plate or film or an electronic arrangement such as a charge coupled device (CCD) screen.

In order to cast an image on to the screen, the input array lenses are, of course, positive, or convex lenses, and the output lenses are, naturally, similar.

The input and output lenses must be spaced about the equivalent of their focal lengths from the central microlens screen, which makes the arrangement somewhat more than two focal lengths long.

Problems arise with such lens arrangements that require more or less expensive measures for their solution or alleviation. One such problem is that the input lenses cast an image of the microlens screen as well as of the image cast on that screen, and graininess in the final images is dependent upon the pitch of the microlens screen. Fine pitch screens are clearly desirable, but correspondingly expensive.

BRIEF SUMMARY OF THE INVENTION

The present invention provides lens arrangements which do not suffer from the problem of graininess yet which a re not expensive and which incidentally have advantages in other ways over the conventional arrangements.

The invention comprises a lens arrangement comprising:

an input negative macrolens array;

an output negative macrolens array disposed with its lenses arrayed correspondingly to those of the input array, and between said input and output arrays, a double convex microlens array.

The input and output arrays may be of plano-concave lenses arranged with their plane faces facing each other and the double convex microlens array having the convex microlens faces contiguous with the plane faces of the input and output arrays.

The input and output arrays may be of equal focal length—giving unit magnification—or they may have different focal lengths and have the principal axes of corresponding macro lenses displaced from each other proportionately to their distance from the principal axis of the arrangement as a whole.

With such arrangements it is possible to correct for chromatic and other aberrations by using glass of different refractive indices and dispersion for the various elements.

Embodiments of lens arrangements according to the invention will now be described with reference to the accompanying drawings, in which:

DETAILED DESCRIPTION OF THE INVENTION

Figure 1:
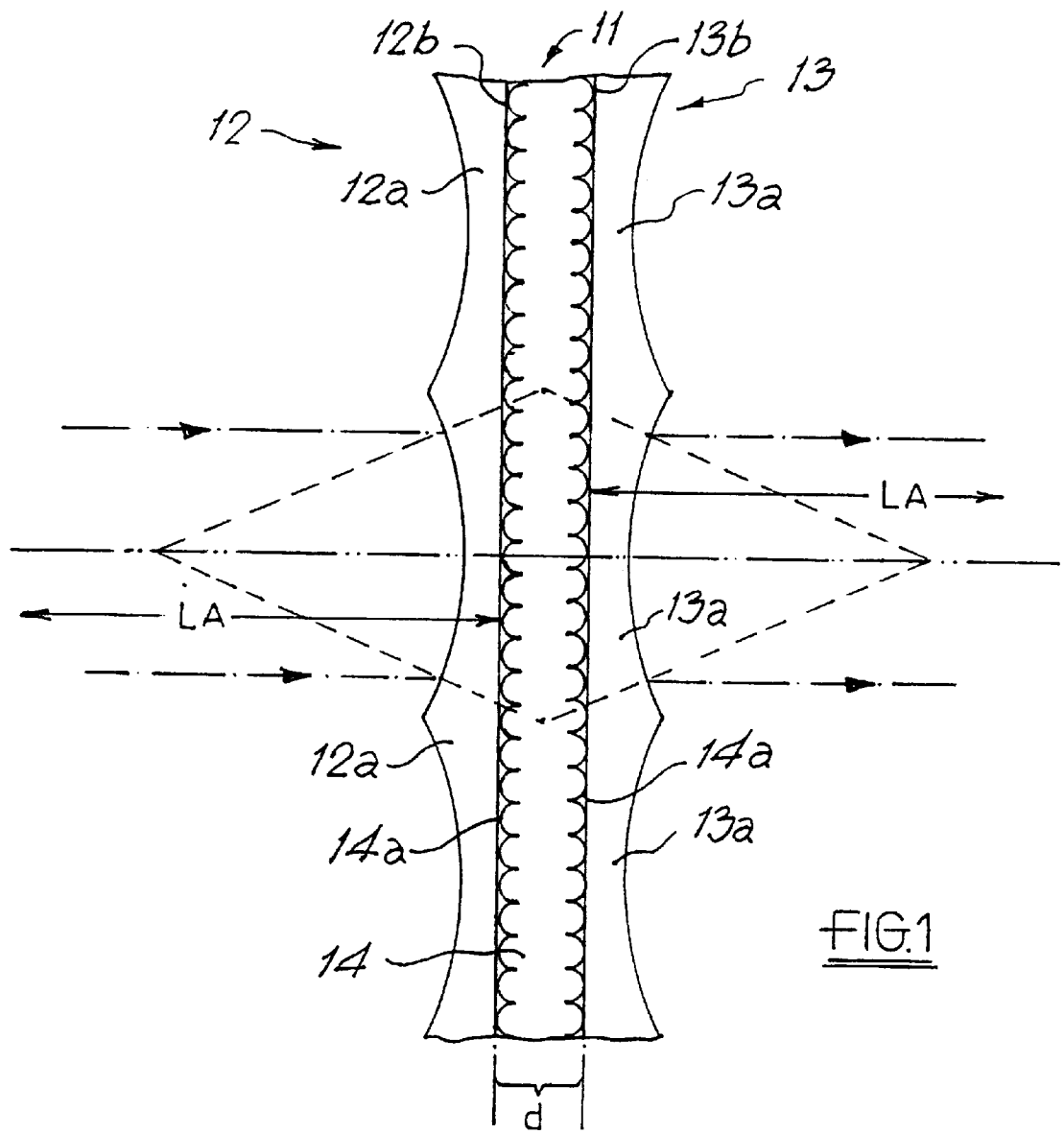
FIG. 1 is a cross-section of a first embodiment.

The drawings illustrate lens arrangements 11 comprising:

an input negative macrolens array 12;

an output negative macrolens array 13 disposed with its lenses 13a arranged correspondingly to those 12a of the input array 12; and between said input and output arrays 12, 13, a double convex microlens array 14.

The input and output arrays 12, 13 are of piano-concave lenses 12a, 13a arranged with their plane faces 12b, 13b facing each other and the double convex microlens array 14 having its convex microlens faces 14a contiguous with the plane faces 12b, 13b of the input and output arrays 12, 13.

In the embodiment of FIGS. 1 to 7, the input and output arrays 12, 13 are of equal focal lengths, that is to say, all the lenses of each array 12, 13 are of the same focal length.

In a typical arrangement, the focal lengths LA of the input and output macrolenses are—80 mm, the macrolens apertures are 21 mm, the microlens pitch (aperture) p is 915 microns, and the distance 'd' between the plane surfaces 12b, 13b of the macrolens arrays 12, 13 is 2.984 mm. The focal length of the microlenses is 1.865 mm giving an F number of 1.6 to cover the full image field.

Figure 4:
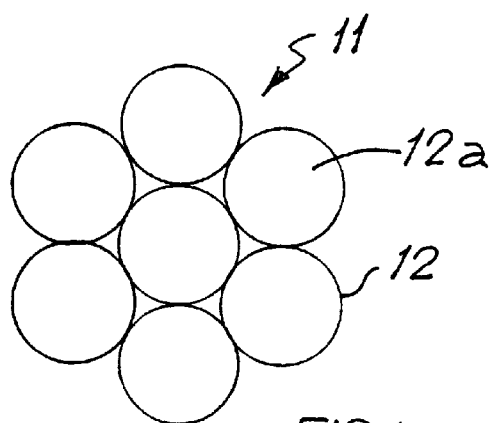
FIG. 4 is a face-on-view of one arrangement of macrolenses.
Figure 5:
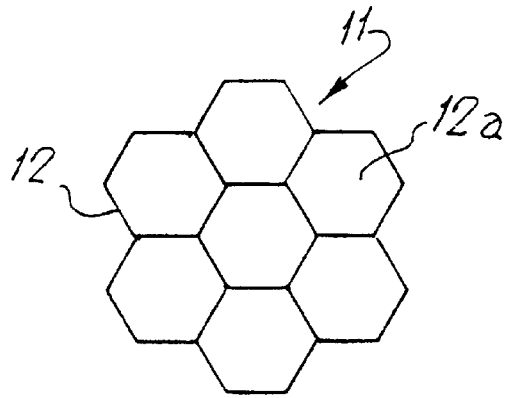
FIG. 5 is a face-on-view like FIG. 4 of a second arrangement.
Figure 6:
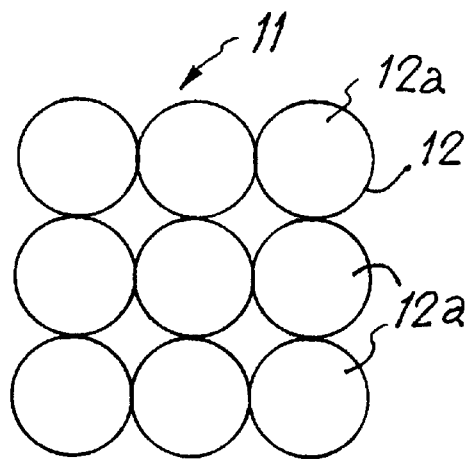
FIG. 6 is a face-on-view like FIG. 4 of a third arrangement.
Figure 7:
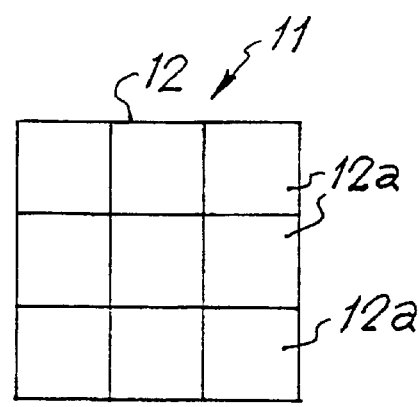
FIG. 7 is a face-on-view like FIG. 4 of a fourth arrangement.

A typical arrangement, again, may have its macrolenses 12a, 13a arranged with circular symmetry in the arrays 12, 13, as seen in FIG. 4, where circular aperture lenses are shown, or in FIG. 5, where hexagonal aperture lenses cover more of the total lens face area, or in rectangular array as seen in FIG. 6 (circular aperture lenses again) and FIG. 7 (square aperture lenses). Wider aperture lens arrangements, either with wider aperture macrolenses or more of them will gather more light and more information to enhance depth perception.

Figure 2:
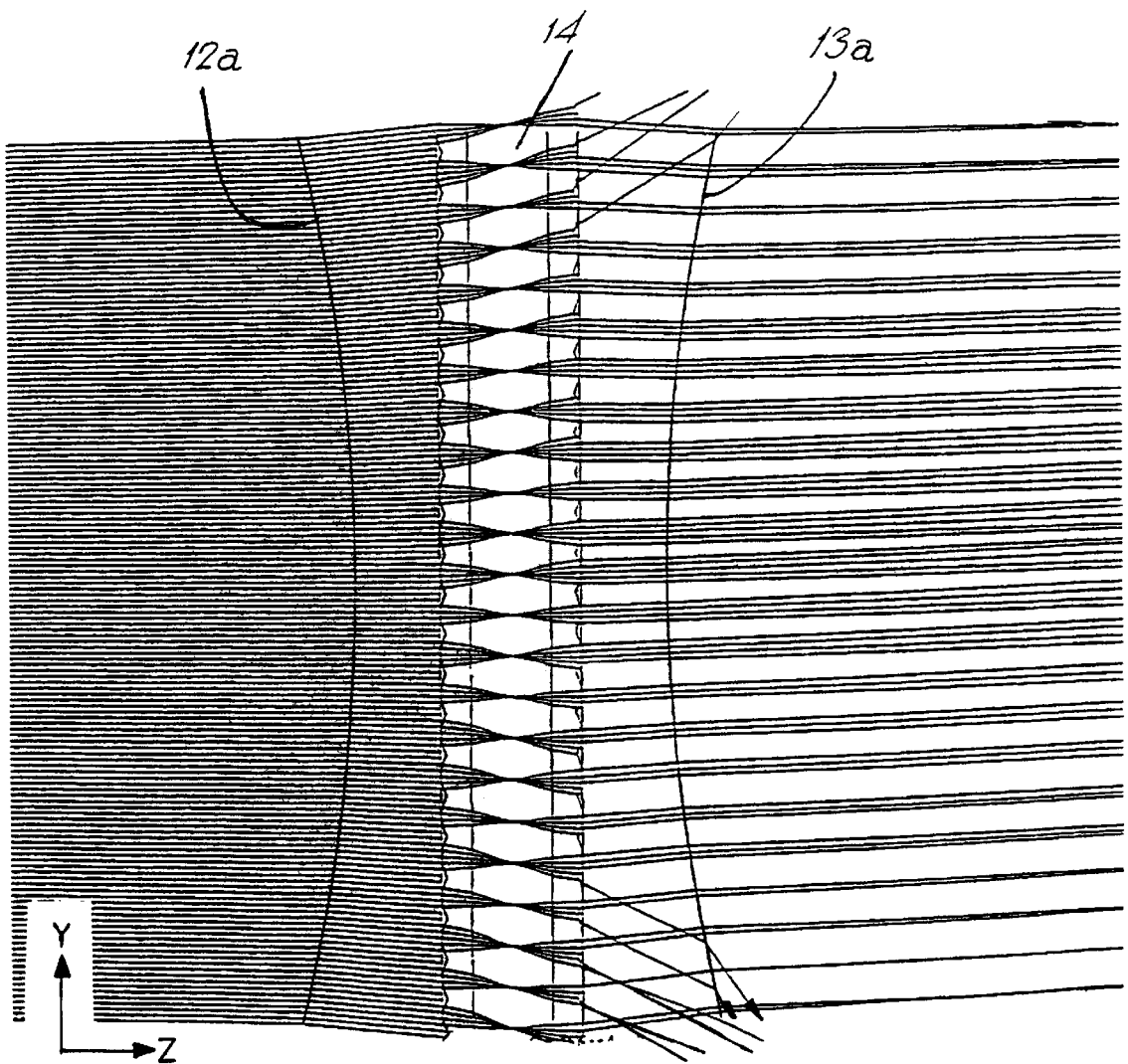
FIG. 2 is a ray tracing through one pair of input and output macrolenses.
Figure 3:
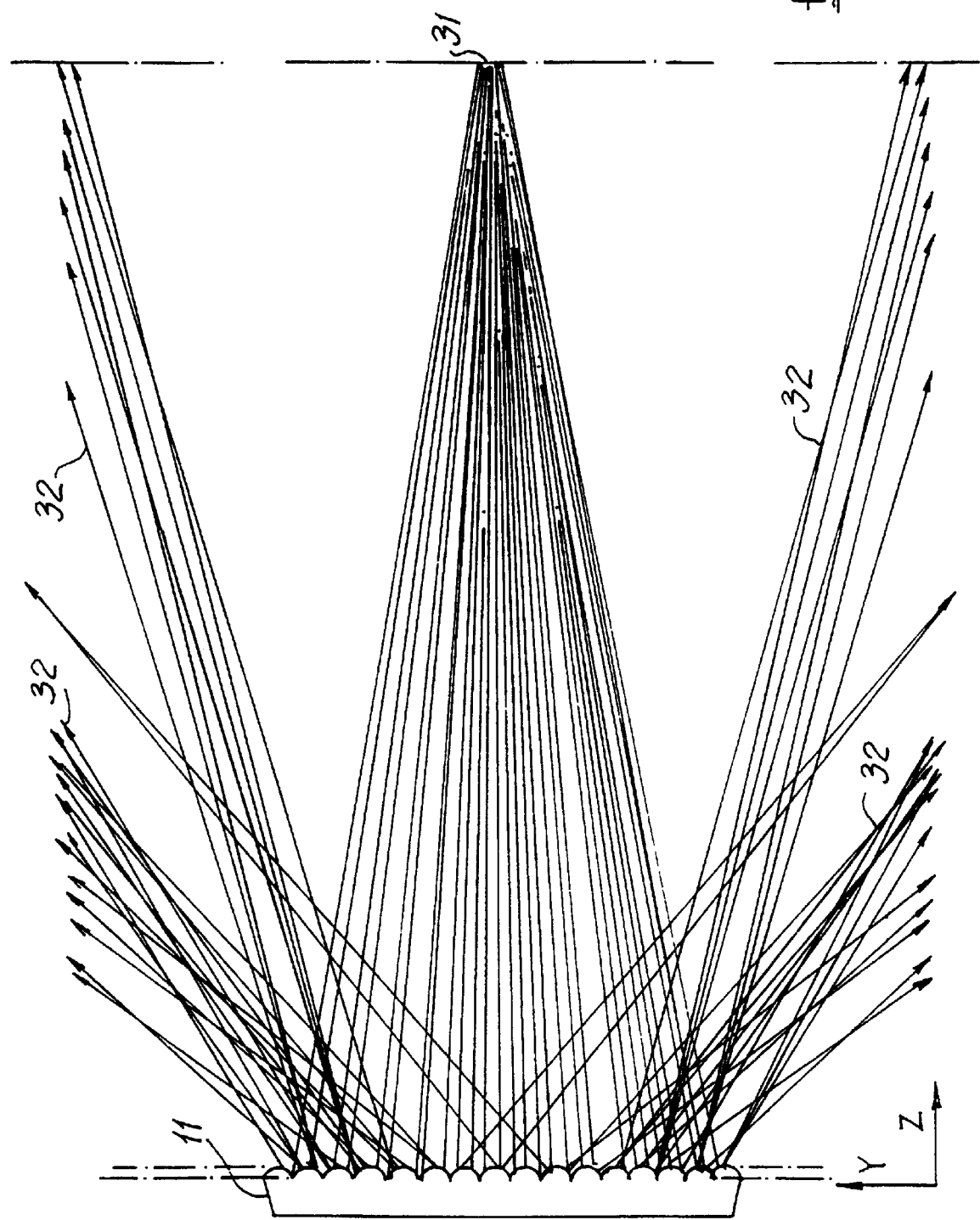
FIG. 3 is a sample ray tracing from the output lens array.

With the arrangement of FIG. 1, the best focus from infinity to the chosen near point of the scene being imaged— the near focal distances, or 'nfd', the microlens pitch p is chosen as $$p = 1.24 a (\lambda/b)^{0.5}$$

where $\lambda$=wavelength of light (say 500 mm) and where $$a = nfd + \left[\left(\frac{LA - nfd}{2}\right) + t\right] + \left[\left(\frac{n-1}{n}\right)t\right]$$

$$b = \frac{LA - nfd}{2}$$

t=thickness of the negative lenses 12a, 13a at thinnest point $\left(\frac{n-1}{n}\right)t$ = increase in optical path length due to lens thickness FIG. 2 shows ray tracings through one pair of input and output macrolenses 12a 13a, while FIG. 3 shows ray tracing over the whole macrolens array. It will be noticed that the principal focus 31 is sharp, but that there are also side bands 32. However, these side bands are not troublesome to viewing because they are deflected out of the viewing area and they do not appear in any event to come to a focus.

Figure 8:
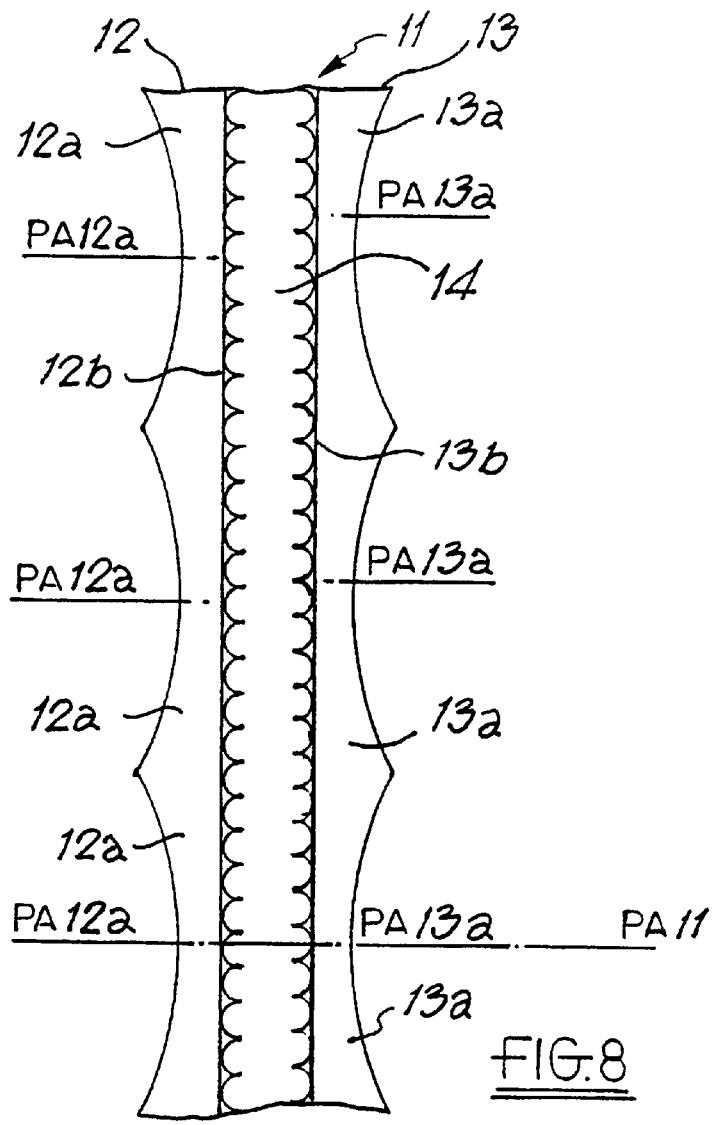
FIG. 8 is a cross-section through a second embodiment.

FIG. 8 illustrates a lens arrangement like that of FIG. 1 except that it is arranged to form a reduced image. The output macrolenses 13a are of higher (negative) power than the input macrolenses 12a and have their principal axes PA12a, PA13a displaced from each other proportionately to their distance from the principal axis PA11 of the arrangement as a whole. The axes are displaced outwards from the main principal axis of the system to bend the rays towards main central axis.

Among advantages that can be derived from lens arrangements according to the invention may be mentioned:

the arrangement is much more compact than previous arrangements using positive macrolenses;

focusing is a simple matter of adjustment along the principal axis;

larger microlenses can be used in the microlens array, because no image is formed of the microlenses—this simplifies registration of the microlenses of the double array and also enables better quality microlenses to be formed;

the focal lengths of the microlenses can be selected for retaining focus from any distance, say 500 mm, to infinity;

the microlenses do not have to image points behind themselves, as all object points are in front—this facilitates the development of corrected microlens separation and enables correct sequential fill of the micro image fields.

as the arrangement does not project images of the microlenses on to the image plane, there are no interference effects in the recorded image;

construction of the lens is simplified;

lateral resolution is no longer governed by microlens pitch.

As mentioned, lens arrangements according to the invention can be used for the same purposes as the prior art, convex macrolens arrangements, in particular as a taking lens in a camera with the film overlain by a microlens decoding screen or in a video arrangement in which a CCD array is overlain by such a screen or decoding is effected electronically.

What is claimed is:

1. A lens arrangement comprising:

an input negative macrolens array;

an output negative macrolens array disposed with its lenses arranged correspondingly to those of the input array, and between said input and output arrays a double convex microlens array.

2. A lens arrangement according to claim 1, in which the input and output arrays are of plano-concave lenses arranged with their plane faces facing each other and the double convex microlens array has the convex microlens faces contiguous with the plane faces of the input and output arrays.

3. A lens arrangement according to claim 2, wherein the input and output arrays are of equal focal length.

4. A lens arrangement according to claim 3, wherein the lens arragement is corrected for aberrations by using glass of different refractive indices for the various elements.

5. A lens arrangement according to claim 2, wherein the input and output arrays have different focal lengths and have the principal axes of corresponding microlenses in the arrays displaced from each other proportionately to their distance from the principal axis of the arrangement as a whole.

6. A lens arrangement according to claim 5, wherein the lens arragement is corrected for aberrations by using glass of different refractive indices for the various elements.

7. A lens arrangement according to claim 2, wherein the lens arragement is corrected for aberrations by using glass of different refractive indices for the various elements.

8. A lens arrangement according to claim 1, in which the input and output arrays are of equal focal length.

9. A lens arrangement according to claim 8, wherein the lens arragement is corrected for aberrations by using glass of different refractive indices for the various elements.

10. A lens arrangement according to claim 1, in which the input and output arrays have different focal lengths and have the principal axes of corresponding microlenses in the arrays displaced from each other proportionately to their distance from the principal axis of the arrangement as a whole.

11. A lens arrangement according to claim 10, wherein the lens arragement is corrected for aberrations by using glass of different refractive indices for the various elements.

12. A lens arrangement according to claim 1, corrected for aberrations by using glass of different refractive indices for the various elements.

* * * * *